United States Patent
Kim et al.

(10) Patent No.: US 9,751,152 B2
(45) Date of Patent: Sep. 5, 2017

(54) PREPARATION METHOD FOR SPIRAL LAMINATE COMPOSITE USING COMPRESSIVE TORSION

(71) Applicant: POSTECH ACADEMY-INDUSTRY FOUNDATION, Pohang-si, Gyeongsangbuk-do (KR)

(72) Inventors: Hyoung Seop Kim, Pohang-si (KR); Kang Hyun Choi, Gumi-si (KR); Dong Jun Lee, Daegu (KR); Eun Yoo Yoon, Pohang-si (KR)

(73) Assignee: POSTECH ACADEMY-INDUSTRY FOUNDATION, Pohang-si, Gyeongsangbuk-Do (KR)

( * ) Notice: Subject to any disclaimer, the term of this patent is extended or adjusted under 35 U.S.C. 154(b) by 389 days.

(21) Appl. No.: 14/351,880

(22) PCT Filed: Oct. 2, 2012

(86) PCT No.: PCT/KR2012/007979
§ 371 (c)(1),
(2) Date: Apr. 15, 2014

(87) PCT Pub. No.: WO2013/058486
PCT Pub. Date: Apr. 25, 2013

(65) Prior Publication Data
US 2014/0302339 A1    Oct. 9, 2014

(30) Foreign Application Priority Data
Oct. 20, 2011    (KR) .................. 10-2011-0107407

(51) Int. Cl.
B23K 20/00 (2006.01)
B23K 20/12 (2006.01)
(Continued)

(52) U.S. Cl.
CPC .............. *B23K 20/02* (2013.01); *B21K 25/00* (2013.01); *B23K 20/026* (2013.01);
(Continued)

(58) Field of Classification Search
CPC . B23K 20/12; B23K 20/2333; B23K 2203/18
(Continued)

(56) References Cited

U.S. PATENT DOCUMENTS

| 3,827,138 A * | 8/1974 | Needham ............. B23K 20/121 228/114.5 |
| 7,967,182 B2 | 6/2011 | Nojiri et al. |
| 2011/0113849 A1* | 5/2011 | Takahashi ............... B21C 37/02 72/340 |

FOREIGN PATENT DOCUMENTS

| JP | 2000-23 772 A | 9/2000 |
| JP | 2003-001748 A | 1/2003 |

(Continued)

*Primary Examiner* — Erin Saad
(74) *Attorney, Agent, or Firm* — Revolution IP, PLLC

(57) ABSTRACT

Disclosed is a preparation method for a composite which comprises the following steps: (a) preparing unit metal pieces comprising two or more types of different metals; (b) circumferentially arranging the two or more types of unit metal pieces in a mold comprising upper and lower dies; (c) applying compressive stress to the loaded metal pieces using the upper and lower dies; and (d) rotating the upper and lower dies in one or two directions to apply torque in the pressed state.

5 Claims, 2 Drawing Sheets

(51) Int. Cl.
   *B23K 20/02* (2006.01)
   *B21K 25/00* (2006.01)
   *B32B 15/01* (2006.01)
   *B23K 20/233* (2006.01)
   *B23K 103/10* (2006.01)
   *B23K 103/12* (2006.01)
   *B23K 103/18* (2006.01)

(52) U.S. Cl.
   CPC .......... *B23K 20/2333* (2013.01); *B32B 15/01* (2013.01); *B23K 2203/10* (2013.01); *B23K 2203/12* (2013.01); *B23K 2203/18* (2013.01); *Y10T 29/49908* (2015.01); *Y10T 428/12333* (2015.01)

(58) Field of Classification Search
   USPC ............... 228/112.1, 114.5, 113, 2.1; 72/371
   See application file for complete search history.

(56) References Cited

FOREIGN PATENT DOCUMENTS

JP          4277117 B2     3/2009
KR       10-0541221 B1     1/2006

\* cited by examiner

[Fig.3]
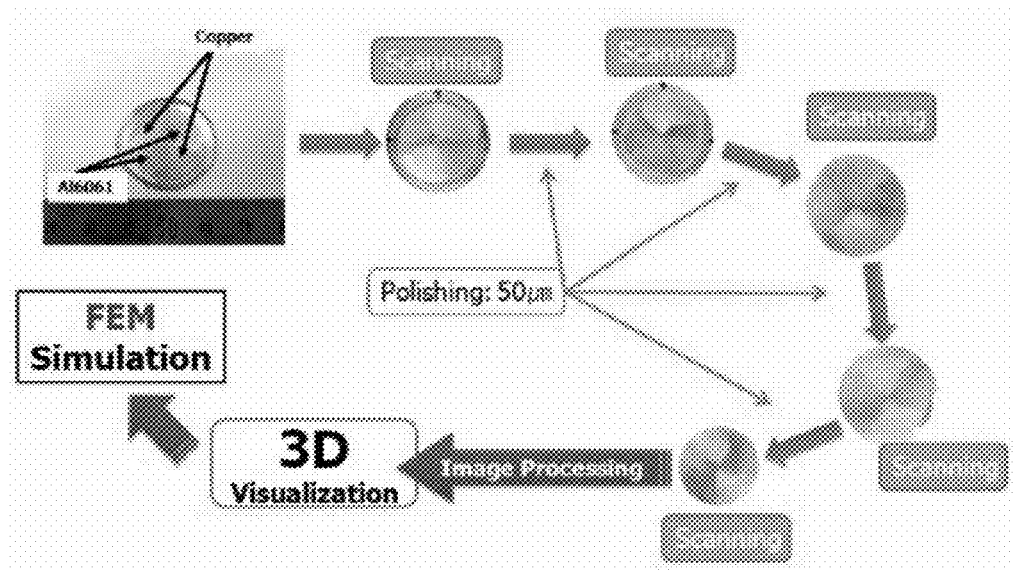
[Fig.4]
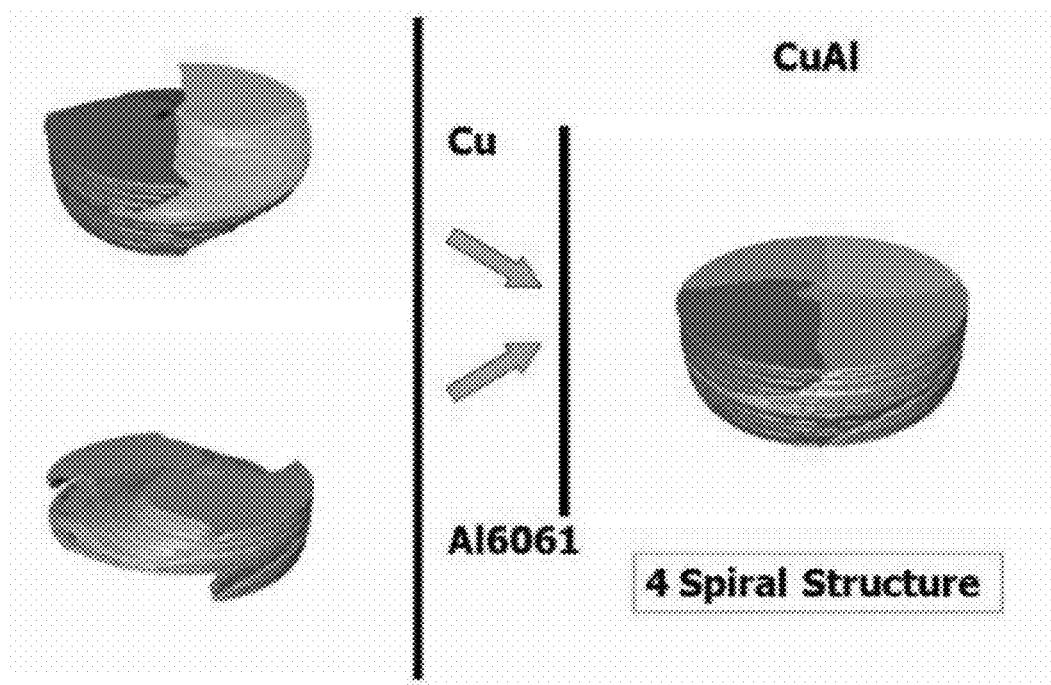

PREPARATION METHOD FOR SPIRAL LAMINATE COMPOSITE USING COMPRESSIVE TORSION

CROSS REFERENCE TO PRIOR APPLICATIONS

This application is a National Stage Application of PCT International Patent Application No. PCT/KR2012/007979 filed on Oct. 2, 2012, under 35 U.S.C. §371, which claims priority to Korean Patent Application No. 10-2011-0107407 filed on Oct. 20, 2011, which are all hereby incorporated by reference in their entirety.

TECHNICAL FIELD

The present invention relates to preparation of a laminate composite having a spiral structure, and more particularly, to a method of preparing a novel composite, wherein two or more types of metal specimens are circumferentially alternately arranged and then subjected to compressive distortion so as to apply circumferential plastic deformation to the arranged metal specimens, thereby forming spiral metal bonding between two or more types of metals and simultaneously improving mechanical properties of materials such as strength, hardness, wear resistance, etc. by a large shear deformation applied in the composite-making process.

BACKGROUND ART

With the increasing demand in multifunctional materials these days, when any material does not satisfy various desired properties, a material having higher performance may be manufactured by mixing different materials having superior properties.

It is typically exemplified by an insulation material comprising a metal-ceramic laminate. This insulation material compensates for low heat shield of a metal and brittleness of a ceramic by mixing a metal having mechanical rigidity with a ceramic having heat shield.

Examples of the composite may include a laminate composite by simply laminating two materials, a particulate composite by mixing two component particles in powder form, a fiber reinforced composite by implanting steel wires or fibers in a matrix in a specific direction, etc.

Especially, a laminate composite is mainly used for aircraft wings or insulation materials, and a composite made of concrete or by powder metallurgy is a typical example of a particulate composite. Also, a fiber reinforced composite may be utilized in rubber hoses, car tires, etc.

Recently, a laminate composite of two different materials is receiving attention as a novel material for lightweight constructions because the properties of materials for individual layers may be used together and thus superior mechanical properties such as high strength and hardness, superior wear resistance or superplasticity may be attained.

Meanwhile, thorough research into grain refinement is ongoing to improve the properties of materials all over the world. When a metal is subjected to plastic processing, a dislocation cell structure having small angle boundaries begins to form, and thus, in proportion to an increase in the amount of deformation, angle grain boundaries of dislocation cell subgrains increase and also grains become gradually refined. The method of applying a large amount of deformation to the metal using the above properties to thereby refine grains of the metal into ultrafine grains or nano-sized grains is referred to as a "rigid-plastic process," which has recently increasingly become widespread.

In the rigid-plastic process, shear deformation, rather than compressive or tensile deformation, is more effective in terms of plastic deformation conditions which affect grain refinement of a metal. Hence, the shape of a mold has to be designed so that shear deformation may occur as much as possible in the rigid-plastic process. A variety of rigid-plastic processes, including ECAP (Equal Channel Angular Pressing), HPT (High-Pressure Torsion), ARB (Accumulative Roll Bonding), ECAR (Equal Channel Angular Rolling), etc., have been developed to date.

DISCLOSURE

Technical Problem

Accordingly, an object of the present invention is to provide a method of preparing a laminate composite, which enables composites having various structures to be more simply made, thus corresponding to requirements of diverse properties, compared to conventional methods.

Another object of the present invention is to provide a composite, which includes two or more different types of metals spirally laminated in a thickness direction and in which the structure thereof may be variously modified, thus attaining properties which cannot result from simple laminate composites.

Technical Solution

In order to accomplish the above objects, the present invention provides a method of preparing a laminate composite, comprising (a) preparing two or more types of unit metal specimens comprising different metals; (b) circumferentially arranging the two or more types of unit metal specimens in a mold having upper and lower dies; (c) applying compressive stress to the loaded metal specimens using the upper and lower dies; and (d) rotating either or both of the upper and lower dies to apply torque to the metal specimens which are pressed.

Also, in the method according to the present invention, in (b), the two or more types of unit metal specimens may be circumferentially periodically or aperiodically arranged.

Also, in the method according to the present invention, properties of the composite may be controlled by adjusting the number of loaded unit metal specimens in (b).

Also, in the method according to the present invention, properties of the composite may be controlled by adjusting the number of rotations in (d).

Also, in the method according to the present invention, in (b), two different types of metals may be periodically arranged in an A-B-A-B. . . pattern.

Also, in the method according to the present invention, A may be copper or a copper alloy and B may be aluminum or an aluminum alloy.

Also, in the method according to the present invention, the unit metal specimens may have a fan shape or a semicircular shape.

In addition, the present invention provides a composite comprising two or more different types of metals, wherein the two or more types of metals are spirally laminated in a thickness direction.

Also, in the composite according to the present invention, of the two or more types of metals, one may be copper or a copper alloy and the other may be aluminum or an aluminum alloy.

Also, in the composite according to the present invention, when viewed in a thickness direction, the composite may be configured such that the two or more types of metals are circumferentially periodically alternately arranged.

Advantageous Effects

According to the present invention, a composite is configured such that two or more different types of materials are spirally laminated in a thickness direction, thus exhibiting properties different from those of a simple laminate structure.

Also, according to the present invention, a method of preparing a composite enables preparation of a composite having superior interfacial bondability by a simple process including loading unit metal specimens in a mold and then performing compressive rotation.

Also, according to the present invention, the method of preparing the composite enables the structure of the composite to be diversified by adjusting the number of unit metal specimens or the number of rotations.

Also, according to the present invention, the method of preparing the composite involves a rigid-plastic process, thus causing grain refinement in the composite-making process, resulting in a composite having improved properties compared to initial loaded materials.

DESCRIPTION OF DRAWINGS

FIG. 3 is a schematic view illustrating a serial sectioning process; and

FIG. 4 is a view illustrating results of the composite prepared in the present example as analyzed by the serial sectional process of FIG. 3.

MODE FOR INVENTION

Hereinafter, a detailed description will be given of a method of preparing a composite according to preferred embodiments of the present invention with reference to the appended drawings, but these embodiments are not construed as limiting the present invention. Therefore, it is apparent to those having ordinary knowledge in the art that the present invention be variously modified within a scope that does not depart from the spirit of the invention.

Figure 1:
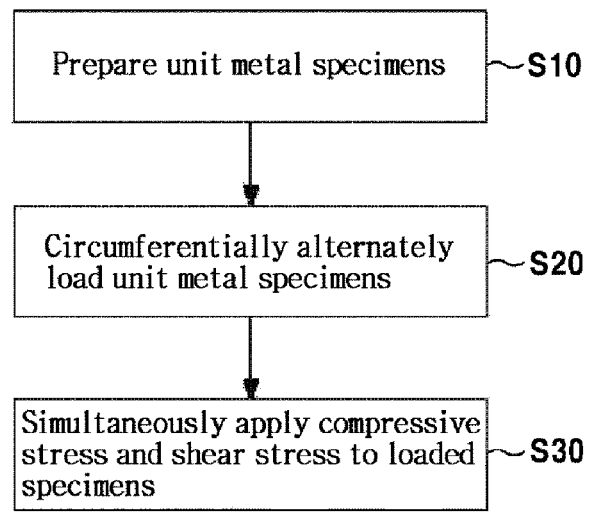
FIG. 1 is a flowchart illustrating a process of preparing a composite according to the present invention.

As illustrated in FIG. 1, the process of preparing the composite according to the present invention includes preparing metal specimens (S10), loading the specimens (S20) and performing compressive shear deformation of the specimens (S30).

Figure 2:
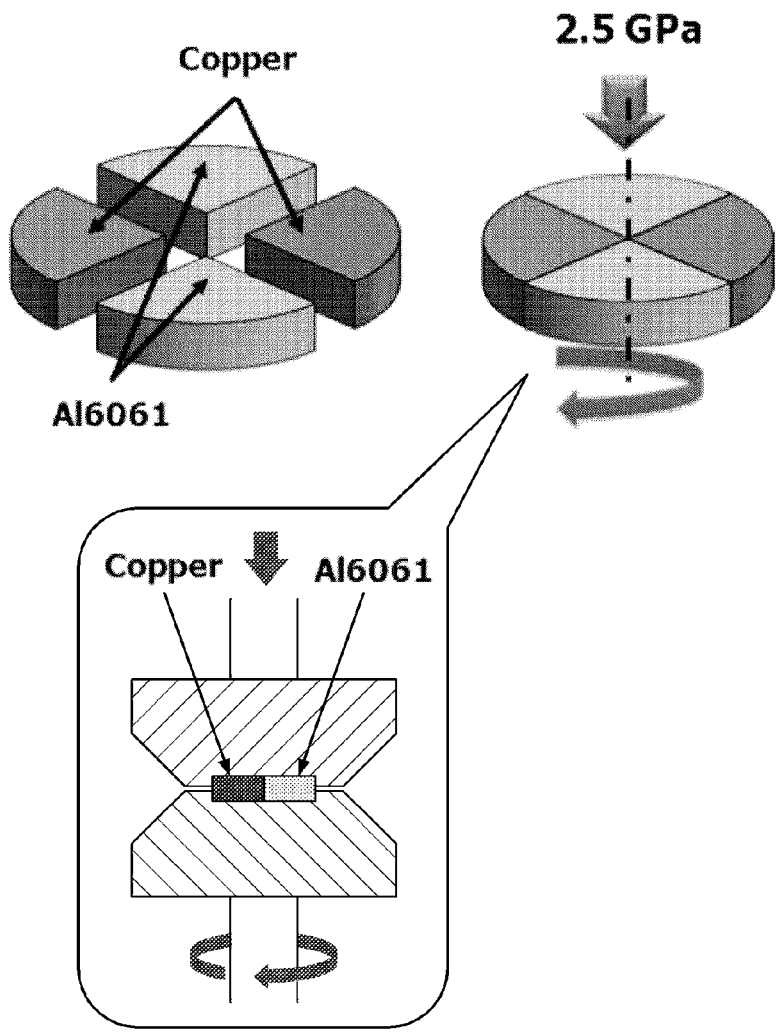
FIG. 2 is a schematic view illustrating a process of preparing the composite according to the present invention.

As illustrated in FIG. 2, preparing the metal specimens (S10) is a step of cutting bulk metal to a fan shape (division in four, six, etc. equal parts) or a semicircular shape (division in two equal parts) so that specimens comprising different types of metals are adjusted to form a cylindrical shape and then loaded in a mold. The type of metal specimen for a composite is not limited, and a variety of metals, including two, three, four, etc. types of metals, may be made into a composite depending on the properties required of the composite. Also, the composite-making method according to the present invention adopts a compressive torsion process. This process is advantageous because a large deformation may be easily applied and brittle metal may be processed, and thereby not only good ductile metal but also somewhat brittle metal may be made into a composite.

As illustrated in FIG. 2, loading the specimens (S20) is a step of circumferentially loading different types of metal specimens in a periodic pattern such as A-B-A-B, A-B-C-A-B-C or A-B-C-D or in an aperiodic pattern such as A-B-B-C-A to ensure a total cylindrical shape. The lamination period and the type of metal to be laminated are not limited, but may be adjusted so as to be adapted for required properties because the properties of the resultant composite may vary depending on the lamination period and the type of metal to be laminated.

Performing compressive shear deformation (S30) is a step of applying torque to the loaded specimens which are pressed using the upper and lower dies to undergo shear deformation. As such, the surfaces of the upper and lower dies are preferably provided with recesses (凹), so as to prevent movement of the specimens when torque is applied thereto. Also, torque may be applied by rotating either of the upper and lower dies or by rotating both of them in different directions. Because the structure of the composite in a thickness direction may significantly vary depending on the number of rotations, the number of rotations is preferably adjusted so as to attain required properties. Furthermore, upon compressive shear deformation, grain refinement may occur through dynamic recrystallization. Thus, the method of preparing the composite according to the present invention may result in improved properties by grain refinement in coincidence with the composite-making process.

Thereby, the composite having a spiral structure is afforded, thus obtaining unique electrically conductive properties or elastic properties which cannot result from conventional simple multilayered composites.

EXAMPLE

Specifically, bulk copper (A metal) and A606 aluminum alloy (B metal) were processed, thus manufacturing metal specimens having a fan shape resulting from dividing a circle in four equal parts, as illustrated in FIG. 2. Subsequently, the copper-aluminum alloy unit specimens were circumferentially alternately arranged in an A-B-A-B pattern in a cylindrical mold having an upper die and a lower die. The surfaces of the upper die and the lower die were provided with recesses (凹) for inserting specimens, so that the arranged specimens were easily fixed. On the other hand, the shape of the composite structure may be controlled by adjusting the size of the loaded specimens.

Subsequently, the specimens were pressed by the upper and lower dies at a pressure of 2.5 GPa, and then torqued and thus distorted. As such, the number of distortion rotations was adjusted, making it possible to control the interlayer interval of the resulting composite and the amount of deformation. In the present example, the number of distortion rotations was set to 1.

The compressive distortion process according to the present example is advantageous because the composite-making process may be very easily implemented, a large deformation may be easily applied, and light brittle metal may undergo the composite-making process.

In order to analyze the internal structure and the bondability of the composite prepared in the present example, serial sectioning was used. As illustrated in FIG. 3, serial sectioning was executed in such a manner that the cross-section of a specimen was polished at a predetermined interval and then photographed, after which the serial 2D photos were converted into actual 3D images by means of an image processing operation.

Specifically, while the composite specimen was polished to a thickness of 0.05 mm, individual 2D photos were obtained through scanning, and then 3D visualized by image analysis processing using AMIRA program. FIG. 4 shows the analyzed image. Also, phenomena such as interfacial separation, etc., could not be observed in the course of polishing the composite specimen, and thus the interfacial integrity of the composite according to the present invention was evaluated to be good.

As illustrated in FIG. 4, the composite prepared in the present example has a spiral laminate structure in a thickness direction, which means that it has a continuous structure between heterogeneous composite metals compared to conventional simple laminate structures, and also that electrically conductive properties or elastic properties which were difficult to ensure in conventional composites can be attained.

The invention claimed is:

1. A method of preparing a laminate composite, comprising:
 (a) preparing two types of unit metal specimens comprising different metals;
 (b) circumferentially arranging the two types of unit metal specimens in a mold having upper and lower dies, wherein the two types of unit metal specimens are circumferentially arranged in an A-B-A-B pattern;
 (c) applying compressive stress to the loaded metal specimens using the upper and lower dies; and
 (d) rotating either or both of the upper and lower dies to apply torque to the metal specimens which are pressed and forming the laminate composite having a spiral laminate structure in a thickness direction.

2. The method of claim 1, wherein properties of the composite are controlled by adjusting the number of loaded unit metal specimens in (b).

3. The method of claim 1, wherein properties of the composite are controlled by adjusting the number of rotations in (d).

4. The method of claim 1, wherein A is copper or a copper alloy, and B is aluminum or an aluminum alloy.

5. The method of claim 1, wherein the unit metal specimens have a shape of a circular sector or a semicircular shape.

* * * * *